United States Patent [19]

Sakurai et al.

[11] 3,877,749

[45] Apr. 15, 1975

[54] REAR SEAT PASSENGER-PROTECTING SEAT BACK STRUCTURE FOR AUTOMOTIVE VEHICLE

[75] Inventors: Katsuo Sakurai; Takeshi Yamawaki, both of Toyota, Japan

[73] Assignee: Toyota Jidosha Kogyo Kabushiki Kaisha, Toyota-shi, Aichi-ken, Japan

[22] Filed: Apr. 23, 1973

[21] Appl. No.: 353,702

[30] Foreign Application Priority Data
July 20, 1972  Japan.............................. 47-72697

[52] U.S. Cl................................. 297/216; 297/390
[51] Int. Cl............................................. B60r 21/02
[58] Field of Search........... 297/216, 390, 384, 452, 297/460

[56] References Cited
UNITED STATES PATENTS

| | | | |
|---|---|---|---|
| 2,098,456 | 11/1937 | Leader............................... | 297/452 |
| 2,833,339 | 5/1958 | Liljengren......................... | 297/216 |
| 3,464,751 | 9/1969 | Barecki............................. | 297/216 |
| 3,537,751 | 11/1970 | Inoue et al........................ | 297/452 |
| 3,669,498 | 6/1972 | Meyers.............................. | 297/452 |
| 3,695,707 | 10/1972 | Barecki............................. | 297/460 |
| 3,802,737 | 4/1974 | Mertens............................. | 297/216 |

FOREIGN PATENTS OR APPLICATIONS
555,246   4/1958   Canada.............................. 297/216

*Primary Examiner*—Francis K. Zugel
*Attorney, Agent, or Firm*—Stevens, Davis, Miller & Mosher

[57] ABSTRACT

A seat back structure in an automobile or the like for protecting a passenger on a rear seat, comprising a main frame board of a front seat back, an upper buffer body secured integrally to the upper part of the main frame board and projecting towards the rear seat, and a lower buffer board secured integrally to the lower part of the main frame board, said lower part having an opening. When, in case of a collision of the automobile or the like, the knees of the passenger violently collides against that part of the rear of the front seat back which corresponds to the lower buffer board, said lower buffer board undergoes a plastic deformation towards the opening, thereby to absorb the impact load of the knees. When the breast and head of the passenger violently collide against that part of the front seat back which corresponds to the upper buffer body, said upper buffer body undergoes a plastic deformation, and subsequently the main frame board undergoes a frontward plastic deformation, thereby to absorb the impact load of the breast and head.

8 Claims, 8 Drawing Figures

$\theta_N$: Angular Displacement of Seat Back due to Load of Knees $\theta_C$: Angular Displacement of Seat Back due to Loads of Head and Breast

REAR SEAT PASSENGER-PROTECTING SEAT BACK STRUCTURE FOR AUTOMOTIVE VEHICLE

The present invention relates to the seat back structure of the front seat of an automobile. More particularly, it relates to the seat back structure of the front seat for protecting passengers on the rear seat, the structure being adapted to reliably and easily absorb and relieve the striking energy of the secondary collision of the rear seat passenger as arises at, for example, the head-on collision or rear-end collision between running automobiles or the collision between an automobile and another thing, whereby it protects the passenger from a death or injury accident.

As the general movements of a passenger on the rear seat at the collision of a car, it is known that, first, the knees crash against the back of the front seat due to the impact force and that, subsequently, the breast, head etc. crash. At this time, the front seat back is markedly brought down frontwards on account of the impact load of the knees, so that the restraint of the breast and head is delayed to become insufficient. As seen in recorded cases, such phenomena therefore occur that the passenger leaps over the seat back to crash against a passenger on the front seat or an instrument panel, and that he passes over the seat back to break the front glass and to be thrown out of the car room.

In general, the seat of an automobile has emphases placed on the posture for driving, the comfortable ride, the design, and so forth. As regards the protection of the rear seat passenger, it is the present situation that almost no measure is taken. As the protecting measure for the rear seat passenger, some types of seats are constructed such that a pad member containing a synthetic resin material as its main meterial and serving as an impact energy absorber is interiorly provided at a predetermined position of the rear of a frame member of the front seat back. The seat back, however, is imperfect in order to fully absorb the shock energy of the rear seat passenger at the collision and thereby prevent the aforesaid phenomena, and is functionally insufficient in order to reliably protect the passenger from a death or injury accident.

On the other hand, as devices for protecting the rear seat passenger by suppressing his movements at the collision, there are known, for example, a seat belt which is disposed at a predetermined position of the rear seat, and a gas bag which is disposed on the rear side of the front seat back. However, the former is troublesome in the fastening operation, and hence, its rate of use is generally low. The latter has many problems yet remaining unsolved, and it is the real situation that it is not adopted at all in a variety of automobiles commercially available at present.

In view of the above-mentioned disadvantages, the present invention has its object in providing a seat back structure for protecting a passenger on a rear seat in an automobile or the like, which absorbs and relieves the energy of the secondary collision of the rear seat passenger of the car by the plastic deformation of a seat back at the collision of the automobile and which is independently deformed so as to prevent any influence of the plastic deformation at this time from being exerted on the supporting point of the seat back and the upper part of the seat back, whereby the structure protects the passenger from a death or injury accident reliably and easily.

The above and further objects and novel features of the invention will more fully appear from the following detailed description when the same is read in connection with the accompanying drawings. It is to be expressly understood, however, that the drawing is for purpose of illustration only and is not intended as a definition of the limits of the invention.

Figure 7:
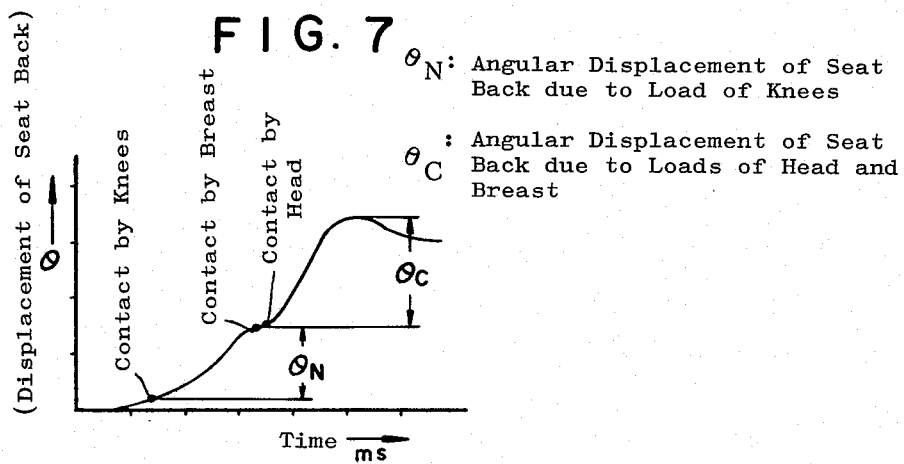
Figure 8:
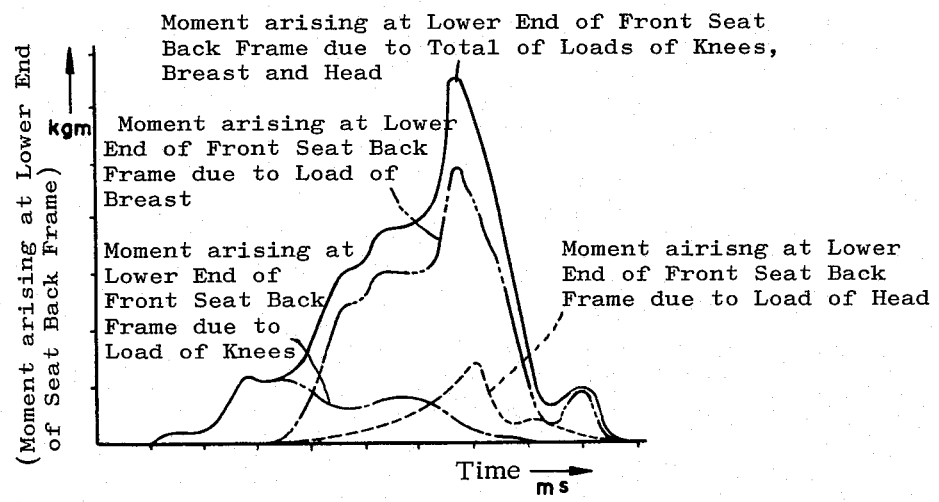

FIG. 7 is a diagram showing the relationship between the frontward falling displacement of a seat back frame and the time, the displacement being caused by the impact load of a rear seat passenger when he violently collides against a prior-art front seat back; and FIG. 8 is a diagram showing the relationship between the moment and the time, the former being caused at the lower end of the seat back frame when the rear seat passenger violently collides against the prior-art front seat back.

Referring to these figures, a main frame board 1 made of a steel plate material, a steel pipe material or a synthetic resin material having a suitable thickness or a combination thereof is integrally constructed of an upper frame board 2 and a lower frame board 3.

The main frame board 1 is formed in such manner that the upper and lower frame boards 2 and 3 have an upper left member 2a and an upper right member 2b, being bilaterally symmetric, and a lower left member 3a and a lower right member 3b, also being bilaterally symmetric, integrally combined on a center line extending along the longitudinal direction of the main frame board 1 from the upper end to the lower end thereof, respectively. In the vicinity of a joining portion 4 between the lower end edge of the upper frame board 2 and the upper end edge of the lower frame board 3, penetrating slots 5 and 5 of appropriate width and length are provided at positions bilaterally symmetric with respect to the center line of the main frame board 1 in a manner to extend in a direction orthogonal to the joining portion 4. At the central part of the lower frame board 3, there is formed an opening portion 6 of large size.

In the figures, reference numeral 9 designates supporting arm rods which are disposed by being secured onto the outer surface of right and left side plates 7 and 8 of the main frame board 1.

Figure 3:
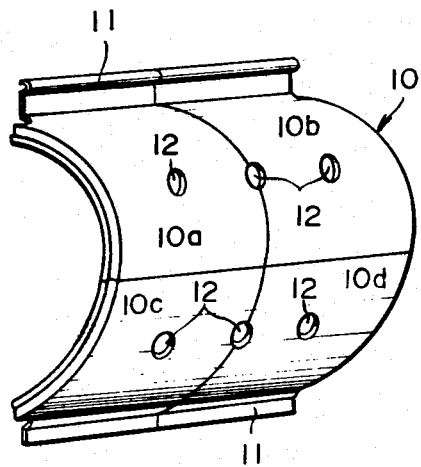
FIG. 3 is a perspective view of an upper buffer body as seen from its rear.
Figure 4:
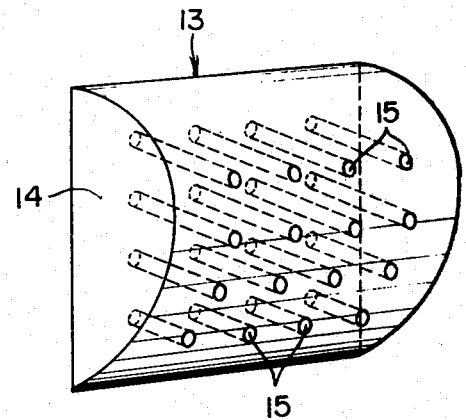
FIG. 4 is a perspective view showing another embodiment of the upper buffer body.

Each of FIGS. 3 and 4 shows an upper buffer body which is formed by the use of such material as a steel plate material, a synthetic resin material and a rubber material so as to be disposed on the upper frame board 2 being the upper part of the rear of the main frame board 1.

The first embodiment of the upper buffer body 10 in FIG. 3 is made of such material as a steel plate or a synthetic resin, it swells out towards the rear seat, and it presents a semicircular shape in longitudinal section. The buffer body 10 is integrally formed at its upper and lower ends with flange portions 11 and 11 each having an adequate width. The upper buffer body 10 is constructed in such manner that members 10a, 10b, 10c and 10d into which the swelling portion of the upper buffer body is divided by the center line in the longitudinal direction and the center line in the lateral direction as orthogonally intersects with the first-mentioned center line are integrally combined. In the arcuate portion of the buffer body 10, a plurality of penetrating apertures 12 are provided at suitable intervals.

On the other hand, the second embodiment of the upper buffer member 13 in FIG. 4 is made substantially semilunar in longitudinal section by the use of such flexible or elastic material as a rubber one and a synthetic rubber one. The buffer body 13 is formed with a number of penetrating aperture portions 15 which extend from a flat face 14 being the inside portion of the buffer body towards the outside face defining a curved surface.

Figure 1:
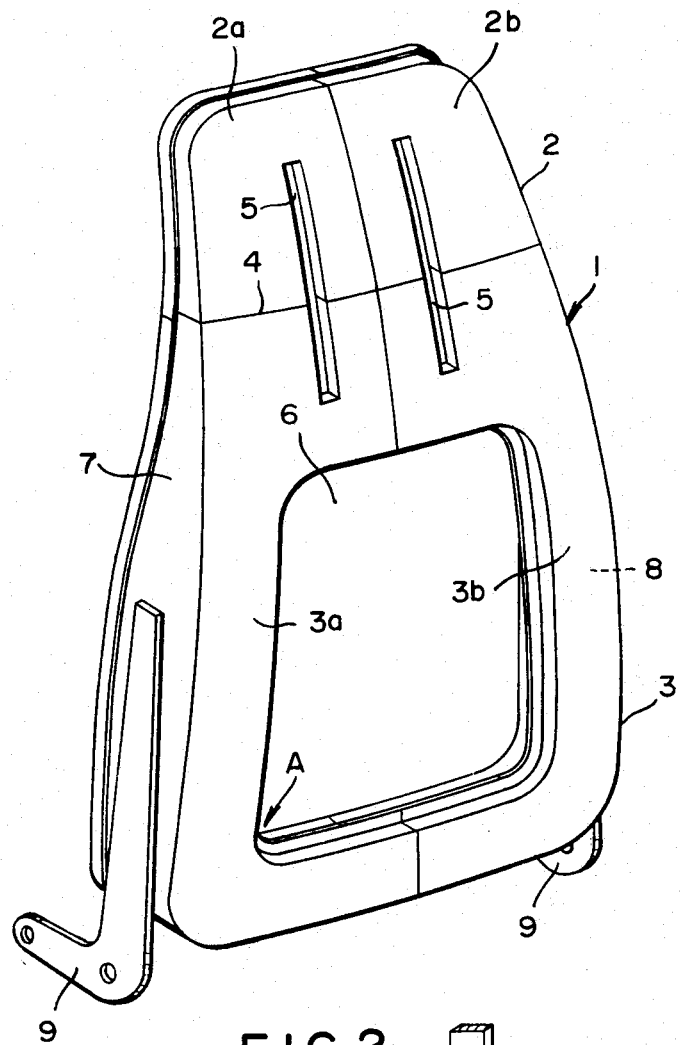
FIG. 1 is a perspective view of a main frame board in a rear seat passenger-protecting seat back structure according to the present invention, the main frame board being seen from its rear.
Figure 2:
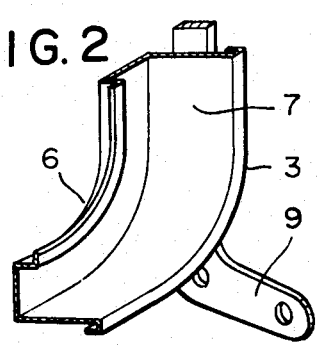
FIG. 2 is a perspective view schematically showing a part of the main frame board as seen in the direction of an arrow (A) in FIG. 1.
Figure 5:
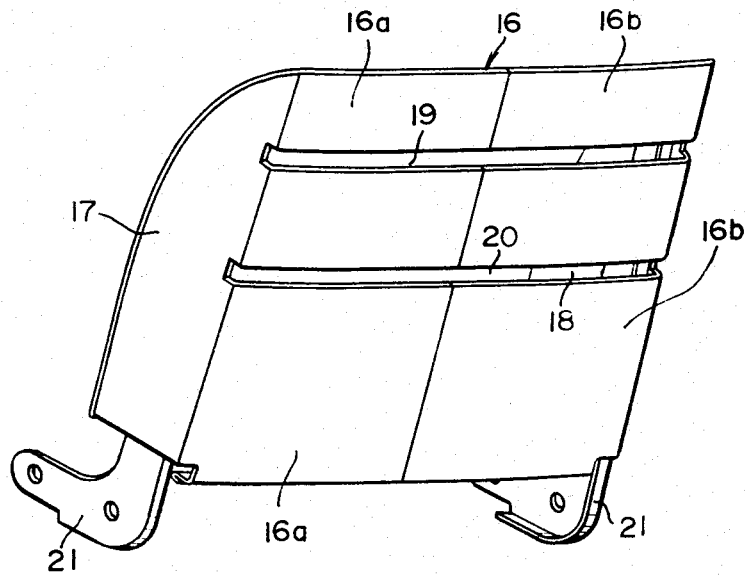
FIG. 5 is a perspective view of a lower buffer board as seen from its rear.

FIG. 5 shows a lower buffer board 16 which is to be disposed on the lower frame board 3 being the lower rear portion of the main frame board 1 shown in FIG. 1, and which is formed using such material as a steel plate, a steel pipe or a synthetic resin. Similarly to the various members previously stated, the buffer board 16 is constructed such that a lower left buffer piece 16a and a lower right buffer piece 16b so divided in bilateral symmetry are integrally combined on a center line in the longitudinal direction of the buffer board.

At upper parts of the lower buffer board 16, penetrating slot portions 19 and 20 each being formed into an appropriate width and an appropriate length and symmetrically with respect to the center line in the longitudinal direction are provided in parallel at a suitable spacing in a manner to extend orthogonally to the center line. To the inside surfaces of right and left side plates 17 and 18 of the lower buffer board 16, there are integrally secured supporting arm rods 21 and 21 for the lower buffer board 16 as are formed of such material as a steel plate or a synthetic resin.

Figure 6:
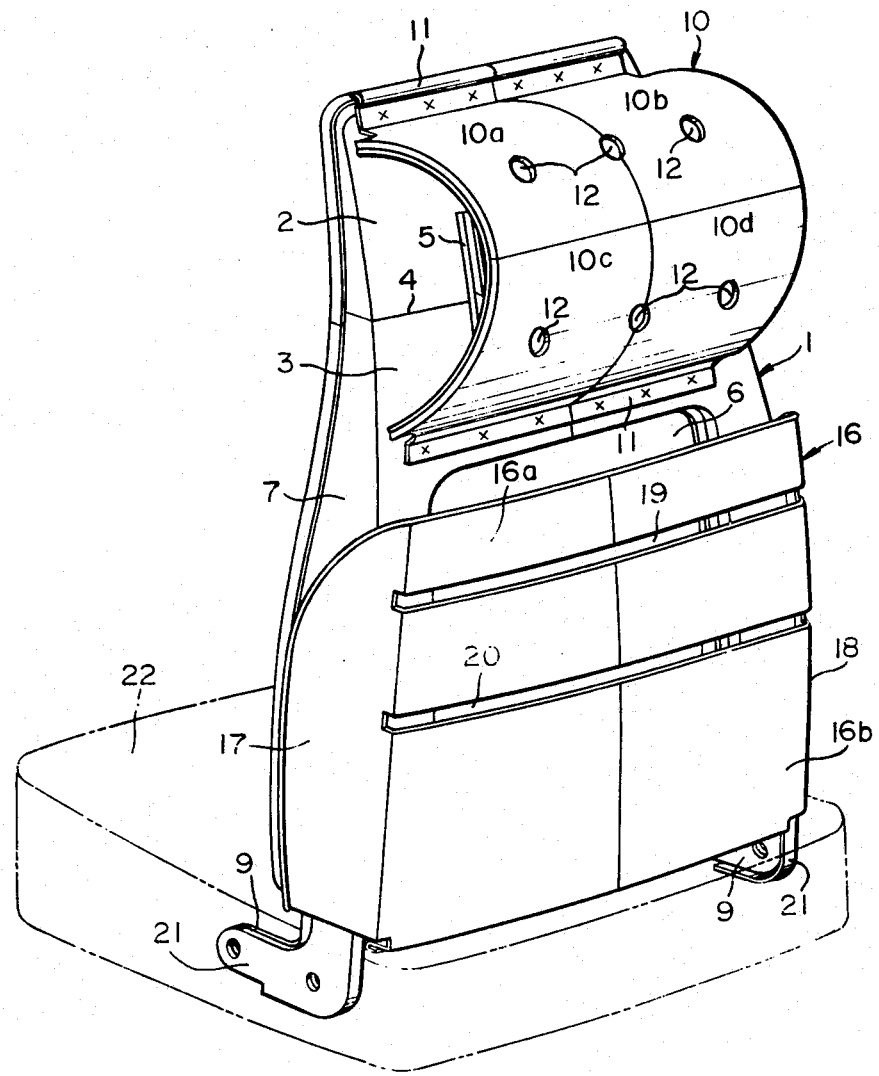
FIG. 6 is a perspective view of the seat back structure which is integrally formed by combining the various members, the structure being seen from its rear.

FIG. 6 is a perspective view showing the structure of the seat back which is integrally assembled by arranging the foregoing various members at predetermined positions. As shown in the figure, the upper buffer body 10 is arranged on the rear of the upper part of the main frame board 1 in a manner to extend over the upper frame board 2 as well as the lower frame board 3. The buffer body 10 is fixed to the main frame board 1 in such way that the flange portions 11 and 11 integrally bent and formed at the upper and lower end portions of the buffer body 10 are integrally secured to the upper and lower frame boards 2 and 3 as shown by marks (x) in the figure by the spot welding or the like means. At the upper part of the rear of the main frame board 1, the upper buffer body 10 is protruded in the swelling shape towards the passenger on the rear seat.

On the rear surface of the lower frame board 3 of the main frame board 1, the lower buffer board 16 is fittedly engaged so as to integrally cover the lower frame board 3. As previously stated, the supporting arm rods 21 are disposed on the inside surfaces of both the side plates 17 and 18 of the lower buffer board 16. The supporting arm rods 21 are covered on the supporting arm rods 9 which are secured onto the outside surfaces of both the right and left side plates 7 and 8 of the main frame board 1. Under this state, the seat back structure of the present invention is disposed by being secured to the frame (not shown) of a seat cushion 22 or a reclining adjuster (not shown) with engaging members such as bolts.

The structure in which each of the foregoing main frame board 1, upper buffer body 10 and lower buffer board 16 is integrally constructed as the combined body of a plurality of divided components, and the structure of the penetrating holes, penetrating slots etc. formed in the various members are so constructed that when the various members are put into the integral forms, the whole structure undergoes a plastic deformation upon application of an impact load exceeding a set value previously determined.

In order to form a seat back using the foregoing various members, the main frame board 1 and the upper buffer body 10 are integrally secured to each other. Thereafter, they are integrally lined with a buffer member which is made of a synthetic resin material, a rubber material or the like. Further, the whole assembly of the main frame board 1 and the upper buffer body 10 as lined with the buffer member is covered with an armoring material such as leather, synthetic leather and cloth, and has the material sewed thereon.

On the other hand, the lower buffer board 16 is also integrally lined with the above buffer member. Thereafter, the whole lower buffer board 16 is sheathed with the above armoring material and has it sewed thereon, thus to be separately formed. The completed lower buffer board 16 is fittedly engaged at the predetermined position on the lower side of the rear of the main frame board 1 so as to cover the lower side. Thus, the formation of the seat back is finished.

Detailed description will now be made of the operation of the seat back of the present invention in the case where an automobile equipped with the seat back comes into a head-on collision, a side collision or a rear-end collision with another automobile or comes into collision with another thing. A rear seat passenger in the case where the body is not restrained by a seat belt, has the body brought into a violent collision against the back of the front seat due to an impact at the afore-collision. In that case, as previously stated, the body of the passenger is generally moved as below. First, the knees violently collide against the lower part of the rear of the front seat back, to cause the seat back to largely fall frontwards. Subsequently, the breast and the head violently collide against the upper part of the rear of the seat back, to cause the seat back to more largely fall frontwards. Therefore, the rear seat passenger passes over the front seat back, and violently collides against, for example, the instrument panel or the front glass, to give rise to a death or injury accident.

In contrast, according to the present invention, when the knees of the rear seat passenger violently collides against the lower buffer board 16 of the rear of the seat back as the secondary collision, the lower buffer board 16 is subjected by the impact load to a plastic deformation towards the opening portion 6 provided in the lower frame board 3 of the main frame board 1. The main frame board 1 is therefore free from any influence by the load of the knees. Accordingly, the impact load is reliably absorbed and relieved without causing the seat back to fall frontwards, and the knees are protected from a serious injury accident.

When subsequently, the breast, head etc. of the passenger violently collide against the upper surface of the upper buffer body 10 disposed in the swelling shape on the rear of the seat back, the upper buffer body 10 undergoes a large plastic deformation due to the impact load (the seat back does not fall frontwards at the plastic deformation of the upper buffer body 10). Subsequently, the main frame board 1 is also subjected to a frontward plastic deformation. Thus, the kinetic energy possessed by the rear seat passenger is securely absorbed and relieved, thereby to avoid a serious damage of the breast and head of the passenger and to prevent the rear seat passenger from leaping out frontwards. The passenger is therefore protected from any death or injury accident.

In general, in case where the rear seat passenger violently collides against the rear of the front seat back as the secondary collision ascribable to the collision of an automobile, the conventional front seat back is largely thrown frontwards by the impact loads of the knees, breast, head etc. as stated above. The relationship between the frontward falling displacement of the seat back due to the impact loads from the rear seat passenger and the time is indicated by a graph as in FIG. 7.

The relationship between the moment caused at the lower end of the frame of the conventional seat back by the loads exerted by the various parts of the body of the rear seat passenger on the seat back and the time becomes a graph shown in FIG. 8. In the case of the prior-art seat back structure, accordingly, when the rear seat passenger is brought into the violent collision against the rear of the seat back, the seat back begins to fall frontwardly on account of the load of the knees of the rear seat passenger. When the load of the breast and head acts, the seat back is deformed more largely, and the rear seat passenger has the great danger of leaping over the seat back. In addition, due to the abrupt frontward falling of the seat back as is attributable to the load of the breast and head of the rear seat passenger, a passenger on the front seat has the great danger that he will be held between the seat back and a steering handle or any other thing, to be pressed to death.

When, on the other hand, the front seat back frame is strenthened in order to prevent the frontward falling of the seat back due to the load of the knees and the load of the breast and head, the amount of the deformation of the seat back as caused by the loads of the rear seat passenger becomes smaller. As a result, the kinetic energy of the rear seat passenger cannot be sufficiently absorbed and relieved, and the rate of injury is increased more.

In contrast, in the case of the rear seat passenger-protecting seat back structure of the present invention as previously stated, when the rear seat passenger violently collides against the rear of the seat back, the knnes are first brought into the violent collision against the lower buffer board. Since, at this time, the knee load subjects only the lower buffer board to the plastic deformation, the main frame board is scarcely thrown frontwards. That is, a component ($\theta_N$) of the displacements of the front seat back in FIG. 7 does not arise at all. Further, a component attributable to the knee load in the moments arising at the lower end of the front seat back frame as shown in FIG. 8 is hardly generated.

Although the breast and head violently collide against the upper buffer body of the seat back after the knees, the main frame board hardly falls frontwards before the violent collision of the breast and head against the upper buffer body. For this reason, the collision of the rear seat passenger becomes one in a stable posture, and it is not feared at all that he will pass over the seat back.

The frontward falling of the main frame board occurs only by the impact load of the breast and head of the rear seat passenger as transmitted through the upper buffer body, and the amount of the front falling is small. Accordingly, the injury accident of the front seat passenger is also preventable.

With the prior-art seat back structure, members for absorbing and relieving the kinetic energy possessed by the knees, breast, head etc. of the rear seat passenger are attached to the seat back frame, so that the seat back is complicated in shape and large in size. As a result, the operations of sheathing, sewing etc. of an armoring material are difficult. With the seat back structure according to the present invention, the assembly consisting of the main frame board and the upper buffer body, and the lower buffer board are separately constructed, and the operations of sheathing, sewing etc. of the armoring material are separately carried out. Thereafter, the finished structure is secured to the seat cushion or the reclining adjuster. Therefore, the operation of laying the armoring material becomes reliable and easy. Since the shape of the lower buffer board can be suitably altered, the degree of freedom in design increases.

Moreover, in the case of the seat back structure of the present invention, any operation by the rear seat passenger as in the seat belt mounted on the rear seat is not necessary. Further, the structure of the present invention is not one operating only at the moment of the collision as is the case of the gas bag device. Therefore, the structure of the present invention attains a satisfactory reliability, and can prevent the death or injury accident of the rear seat passenger from occurring.

What we claim is:

1. A rear seat passenger-protecting seat back structure for an automotive vehicle comprising:

a main frame board of a front seat back positioned on lower supporting arms with an opening portion in the lower part of said main board, an upper buffer body having a semicircular shape which is integrally secured to and disposed on an upper part of said main frame board so as to swell out from the rear surface of said main frame board, and a lower buffer board which is spaced from said main frame board and secured only to said lower supporting arms by bolts, said lower buffer board being positioned adjacent the rear of said opening portion at a lower part of said main frame board, the various constituent members being constructed so that they can undergo plastic deformations when subjected to impact loads exceeding predetermined set values, respectively.

2. The rear seat passenger-protecting seat back structure as defined in claim 1, wherein said main frame board of said front seat back is formed of at least one absorbing material selected from the group consisting of a steel plate material and a steel pipe material.

3. The rear seat passenger-protecting seat back structure as defined in claim 1, wherein said upper buffer body and said lower buffer board are formed of at least one absorbing material selected from the group consisting of a steel plate material, a synthetic resin material and a rubber material.

4. The rear seat passenger-protecting seat back structure as defined in claim 1, wherein said upper buffer body is formed to be substantially semicircular in longitudinal section, and is provided with a number of penetrating apertures from a flat surface towards an arcuate surface of said upper buffer body.

5. A rear seat passenger-protecting seat back structure for an automotive vehicle comprising:
a main frame board of a front seat back, said main frame board of said front back having an upper frame board and a lower frame board integrally joined with each other, said upper frame board and said lower frame board having an upper right member and an upper left member, being bilaterally symmetric, and a lower right member and a lower left member, also being bilaterally symmetric, integrally formed on a center line in the longitudinal direction of said main frame board as extends from the upper end to the lower end of said main frame board,
penetrating slots of appropriate width and length are provided at positions bilaterally symmetric with respect to said center line of said main frame board in the vicinity of the joining part between a lower end edge of said upper frame board and an upper end edge of said lower frame board and in a manner to extend in a direction orthogonal to said joining part,
an upper buffer body which is integrally secured to and disposed on an upper part of said main frame board so as to swell out from the rear surface of said main frame board, and
a lower buffer board which is secured to and disposed on the rear of an opening portion which is of a large size and is formed at a central part of the lower part of said main frame board, the various constituent members being constructed so that they can undergo plastic deformations when subjected to impact loads exceeding predetermined set values, respectively.

6. A rear seat passenger-protecting seat back structure for an automotive vehicle comprising:
a main frame board of a front seat back,
an upper buffer body which is integrally secured to and disposed on an upper part of said main frame board so as to swell out from the rear surface of said main frame board, said upper buffer body being formed to be semicircular in longitudinal section, and having a plurality of individual members integrally combined into which the swelling portion of said upper buffer body is divided by a longitudinal center line of said upper buffer body and a lateral center line orthogonal to said longitudinal center line,
a plurality of penetrating apertures being provided in the arcuate portion of said upper buffer body, and
a lower buffer board which is secured to and disposed on the rear of an opening portion at a lower part of said main frame board,
the various constituent members being constructed so that they can undergo plastic deformations when subjected to impact loads exceeding predetermined set values, respectively.

7. The rear seat passenger-protecting seat back structure as defined in claim 6, wherein said upper buffer body is formed at upper and lower ends with flange portions.

8. A rear seat passenger-protecting seat back structure for an automotive vehicle comprising:
a main frame board of a front seat back positioned on lower supporting arms with an opening portion in the lower part of said main board,
an upper buffer body having a semicircular shape which is integrally secured to and disposed on an upper part of said main frame board so as to swell out from the rear surface of said main frame board, and
a lower buffer board which is spaced from said main frame board and secured to said lower supporting arms by bolts, said lower buffer board being positioned adjacent the rear of said opening portion at a lower part of said main frame board, the various constituent members being constructed so that they can undergo plastic deformations when subjected to impact loads exceeding predetermined set values, respectively,
said lower buffer board is formed in such manner that bilaterally symmetric members of a lower right buffer piece and a lower left buffer piece are integrally combined on a longitudinal center line of said lower buffer board, and
at least two penetrating grooves are provided at upper parts of said lower buffer board in a manner to extend orthogonally to said longitudinal center line and to be parallel with an appropriate spacing therebetween.

* * * * *